United States Patent [19]

Klancnik et al.

[11] Patent Number: 4,645,092
[45] Date of Patent: Feb. 24, 1987

[54] MACHINE TOOLS

[75] Inventors: Adolph V. Klancnik, Glenview; Kenneth A. Klancnik, Palatine, both of Ill.

[73] Assignee: Universal Automatic Corporation, Des Plaines, Ill.

[21] Appl. No.: 730,498

[22] Filed: May 6, 1985

[51] Int. Cl.⁴ .............................................. B23Q 7/00
[52] U.S. Cl. .................................... 221/239; 221/262; 221/270
[58] Field of Search ............... 221/262, 268, 270, 239, 221/294; 269/34, 25, 254 R, 254 CS

[56] References Cited

U.S. PATENT DOCUMENTS 2,622,488  12/1952  Payne ............................... 221/239 X
3,737,157  6/1973  Kiwalle ............................. 269/34 X

FOREIGN PATENT DOCUMENTS 135461  5/1979  Fed. Rep. of Germany ...... 221/268
770746  10/1980  U.S.S.R. ................................ 221/268

Primary Examiner—Joseph J. Rolla
Assistant Examiner—David H. Bollinger
Attorney, Agent, or Firm—Kinzer, Plyer, Dorn & McEachran

[57] ABSTRACT

Small workpieces are loaded into a pair of detenting (spring-biased) jaws along a loading station center line by a reciprocal feed finger. The jaws are shifted to a work station center line, where tooling is applied, by advancing one jaw toward the other. The jaws are shifted back to the loading station center line where the workpiece is ejected from the jaws concurrently with the loading of the next workpiece.

3 Claims, 5 Drawing Figures

MACHINE TOOLS

This invention relates to machine tools and in particular one employed to tap, bore or face small lightweight cylindrical parts susceptible to distortion or disorientation if not carefully but effectively held and clamped. More particularly the invention is concerned with a pair of spring-biased jaw members which assure tender but positive detent control over a workpiece as it is fed to the jaws in their relaxed state at a loading station; afterwards, the detenting jaw members are bodily shifted laterally to locate the workpiece accurately at the work station where it is placed under slight clamping pressure.

As noted above, we are concerned with small, lightweight pieces. Gravity cannot be depended upon for assured, positive feeding to the jaws at a work station. Such pieces, then, can easily hang up or become disoriented; they can also become stuck during transit by the cutting oil. An object of the invention, of primary order or precedence, is to enable a machine tool for machining small, delicate, lightweight parts to operate faster and more reliably than heretofore and to achieve this in part by so constructing a pair of workpiece clamping jaws that they may be relaxed and in this state employed in a detenting role, controlling in a precise manner movement of a workpiece fed thereto from a ready position. Faster operation from the standpoint of reliable production of small parts is further assured, as another object of the invention, by clamping the workpiece not only by means of the jaws in a detenting role as aforesaid but also by locating the jaws, when a completed workpiece is to be discharged therefrom and another fed thereto, at one side of the work station while thereafter repositioning the jaws (holding the next workpiece) on the center line of the work station and making provision for compressing the jaws to effectively clamp the workpiece when repositioned. As a consequence of machining the piece in one position and discharging it (as well as loading) at a second position, the chances of the piece being discharged to hang up due to tooling effects (chips, oil, corners) are diminished since discharging and loading take place at one side of the tool axis, out of the way of the tool.

IN THE DRAWING

Figure 1:
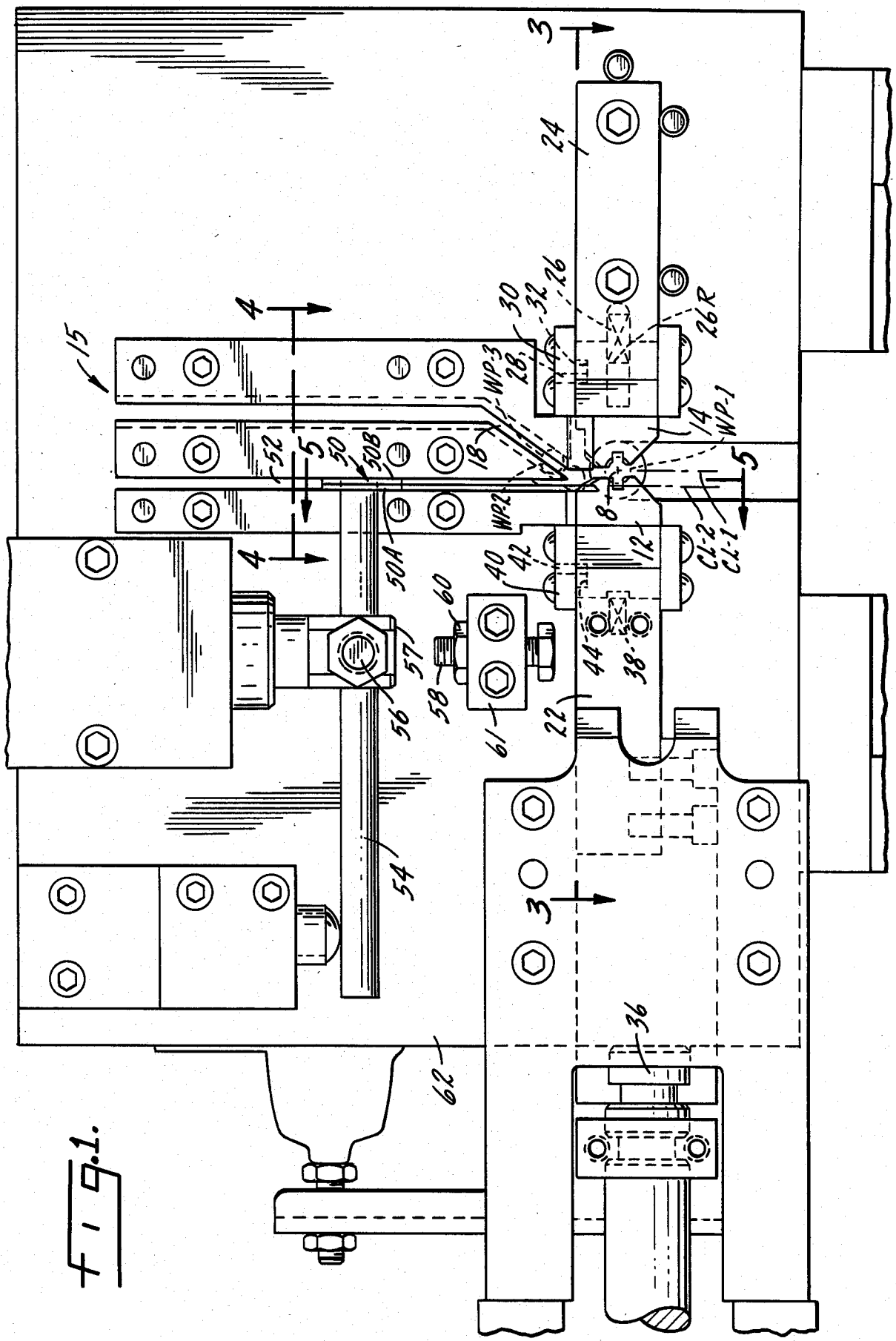
FIG. 1 is a front elevation of a machine tool incorporating the features of the present invention.

It is of primary importance to an understanding of the present invention to realize that we address two center lines, FIG. 1, CL-1 and CL-2. The center lines represent a line through the center point of a recess 8 presented by the opposed ends of a pair of normally separated jaw members 12 and 14 incorporated in the machine tool 15.

When the jaws are on center line CL-1, they are in position to present the workpiece (e.g. WP, FIG. 5) to the tooling, whether it be a tap, drill, or what-have-you. On the other hand, when the jaws have been shifted laterally to the left to center line CL-2, the jaws are in position to receive the next workpiece WP-2 to be machined, fed to the jaws from a magazine guide slot 18.

Figure 2:
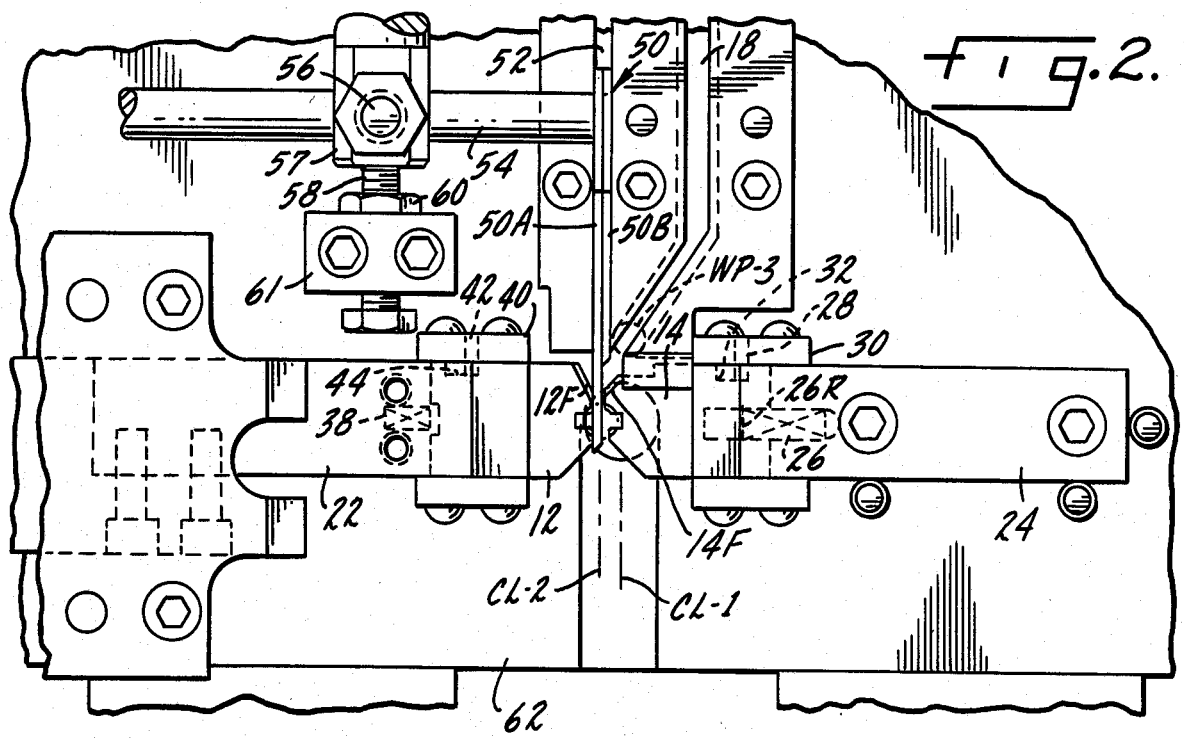
FIG. 2 is a detail view showing the jaws for the workpiece in one position, ready to receive a workpiece at the loading station.

The jaws are supported on respective jaw carriers 22 and 24, FIGS. 1 and 2. Jaw carrier 24 is fixed but nonetheless houses a coil spring 26 which bears against the end of a recess 26R in the back of jaw member 14, tending to bias this jaw member toward the opposing jaw member 12. The allowable movement of jaw member 14 under the spring bias is determined by a stop pin 28, FIG. 1, carried by a bracket 30 fixed to the jaw carrier 24. The jaw member 14 is provided with a slot 32 into which pin 28 projects and by comparing FIG. 1 and FIG. 2 it can be readily perceived the amount of sliding movement which pin 28 permits for jaw member 14 as the result of the bias impressed thereon by spring 26.

Jaw carrier 22 is movable by an air-operated piston 36. Jaw member 12 also houses a coil spring 38 which applies a bias to jaw 12, tending to close the jaw member 12 in the direction of the opposed jaw member 14. Also, a bracket 40 is attached to the jaw support 22, supporting a pin 42 disposed in a limit slot 44 formed in jaw member 12.

In FIG. 1, jaw member 12 has been pushed by the piston 36 to the right. With a workpiece WP-1, FIG. 1, between the jaws, in recess 8, jaw member 14 has been pushed to the right, to the limit allowed by pin 28.

A feed finger assembly 50 is arranged to reciprocate vertically in a corresponding guide slot 52, FIG. 1. The feed finger assembly 50 is secured to an arm 54 in turn secured by a screw 56 to the lower end of an air-operated piston 57 by which the feed finger assembly 50 is advanced or retracted along center line CL-2. An adjustable stop screw 58, mounted in a nut 60, passing through a block 61 secured to a back plate 62, is opposed to the lower free end of piston 57 and limits the downward or feeding stroke of the feed finger assembly 50.

Figure 5:
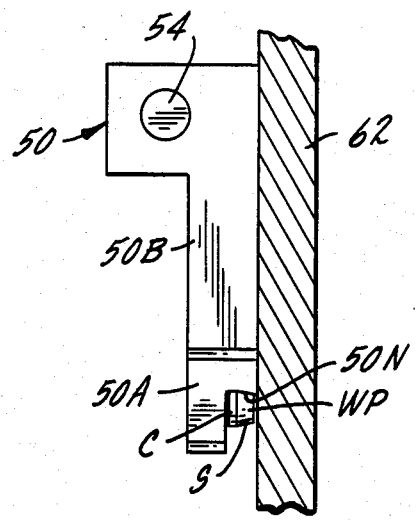
FIG. 5 is a detail view on line 5—5 of FIG. 1 of the feed finger assembly.

The feed finger assembly comprises a long finger 50A and a short finger 50B, FIGS. 2 and 5. Feed finger 50A does the feeding; feed finger 50B blocks the end of feed slot 18, FIG. 2, to hold back the next workpiece to be fed, at the time finger 50A feeds one to the jaws.

In FIG. 1, the jaw members are on center line CL-1 as already noted and in this position they are slightly clamped on opposite sides of the workpiece (shown in phantom in FIG. 1) sufficiently to resist the action of the tooling (not shown) by which the workpiece is tapped, drilled, or otherwise machined.

By retracting piston 36, jaw member 22 is retracted to the left and jaw member 14 follows due to the spring bias of spring 26, until stop pin 32 is effective to limit the movement of the right-hand jaw member 14. The finished workpiece, now held by the effect of the opposing springs 26 and 38, is on center line CL-2, in position to be ejected by the feed finger assembly, concurrently with feeding a a fresh workpiece WP-2 into the jaw members from ready position at the end of slot 18, FIG. 1, as will now be explained.

The feed finger assembly is retracted when workpiece WP-1, FIG. 1, is being machined. Workpiece WP-2 is at the very end of feed slot 18 in ready position and is captured in a notch 50N, FIG. 5, on the backside of finger 50-A. Workpiece WP-3 lies behind workpiece WP-2 in the feed slot.

When the jaws 12-14 are shifted from the working station to the loading station, FIG. 2, the feed finger assembly may be advanced so that workpiece WP-2, FIG. 1, captured in the aforesaid notch 50N at the lower end of the long finger is moved into the recess between the jaws, ejecting the finished workpiece at the same time. The jaws 12-14 can spread as permitted by the spring bias and it will be observed in FIG. 2 that the shorter feed finger 50B blocks the lower end of slot 18, at the point of confluence, so that the workpiece WP-3 is blocked at the threshold of ready position.

Figure 3:
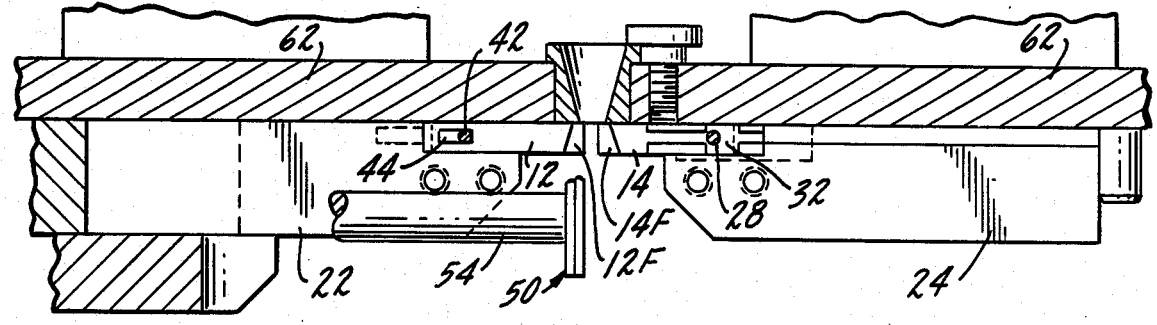
FIG. 3 is a sectional view generally along the line 3—3 of FIG. 1 but also taken through the center of the jaws and including the feed finger in elevation.
Figure 4:
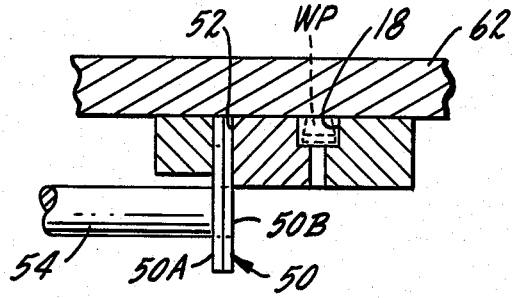
FIG. 4 is a detail view on line 4—4 of FIG. 1.

Each workpiece WP, as shown in FIGS. 4 and 5, has a small cylindrical collar C which is the portion actually clamped in the jaws at the work station; the workpiece also has a slightly tapered shank S and it will be noted in FIGS. 2 and 3 in particular that the upper edges of the two jaws 12 and 14 are slightly chamfered at 12F and 14F in order to cradle the tapered shank of the workpiece, especially as it rests in ready position, FIG. 1. For workpieces of different configuration correspondingly different geometry will be adapted for the notch 50N in the long feed finger and for the recesses at the upper edges of the clamping jaws, as well as the clamping jaw recess itself.

In summary, the workpiece, WP-1, FIG. 1, is slightly but effectively clamped when piston 36 shifts the two jaws into clamping position with recess 8 located on center line CL-1. At this time, the feed finger assembly is retracted and the next workpiece WP-2 is in ready position at the loading station, captured on four sides: at the back by back plate 62, FIG. 5, at the top and front by the notch in feed finger 50A and at the bottom by the chamfer 12F at the upper edge of the left jaw 12.

When the piston 36 is retracted, the finished workpiece is held by detenting forces (mere spring bias) in the jaw recess 8 and the timing is such that when this recess is on center line CL-2, the feed finger assembly may be advanced: WP-2 forces the jaws aside, piece WP-1 is ejected, piece WP-3 is blocked and piece WP-2 eventually attains recess 8, displacing piece WP-1, and the springs perform detent holding. When the jaws are returned to center line CL-1 piston 36 exerts a firm clamp, sufficiently enough to resist the torque of the tool as it does its work on workpiece WP-2.

We claim:

1. A machine tool in which small easily distorted workpieces such as hollow pins, studs and the like disposed in a supply channel are advanced from a ready position therein to a pair of clamping jaws at loading station and from there to a work station, the latter located on a predetermined first center line, where a tapping, drilling, facing or like operation involving torque is performed thereon, comprising: a pair of opposed workpiece clamping jaws for clamping a workpiece at the work station;

a first one of the jaws disposed slidably in a first jaw holder on one side of the work station and a first detent spring biasing the first jaw toward the second jaw at the work station;

the second jaw disposed in a second jaw holder on the other side of the work station and biased by a second detent spring toward the opposed jaw at the work station, the opposing free faces of the jaws presenting a recess substantially complemental to the workpiece to clamp the workpiece at the work station;

a feed finger reciprocal along a second center line at a loading station displaced to one side of said first center line and operating in a guide channel which intersects the supply channel at a point of confluence;

reciprocal means to actuate the second jaw holder in an advancing direction laterally toward the work station thereby to cause the second jaw to push the first jaw toward the first center line against its spring and cooperate with the first jaw effectively to dispose and clamp a workpiece to be machined at the first center line against the torque of the tool and to withdraw the second jaw holder in a return direction toward the second center line, the spring bias on the first jaw causing it to slide in its holder to follow the second jaw during return movement so both jaws hold the machined workpiece by detenting during return movement of the first jaw holder to the second center line, whereby a workpiece is translated back and forth between the stations while clamped between the jaws;

the recess presented by the jaws being disposed substantially at the second center line when the second jaw is returned by the reciprocal means thereby enabling the feed finger to load a fresh workpiece, located at the point of confluence, into and between the free faces of the spring-biased jaws for transfer to the work station when such reciprocal means is next advanced toward the first center line, the machined workpiece being ejected from the recess concurrently with loading the jaws with a fresh workpiece.

2. A machine tool according to claim 1 in which the edges of the jaws nearer said channel are recessed to cradle a workpiece located at the confluence point.

3. A machine tool according to claim 1 in which the first jaw holder is in a fixed position and in which the clamping face of the second jaw in the relaxed state of its detent spring is substantially at the second center line, while the clamping face of the other jaw in the relaxed state of its detent spring is in an opposed position on the opposite side of the second center line so that a workpiece in ready position may be fed to the jaws by the feed finger while the jaw members are in the relaxed, detenting state, there being both a long feed and short finger associated in back-to-back relation, the long feed finger being effective to feed a fresh workpiece to the jaws while concurrently ejecting the machined workpiece, and the short feed finger blocking the supply channel during such concurrent loading and ejecting.

* * * * *